No. 884,175.  
PATENTED APR. 7, 1908.

P. LORENTZEN.

MACHINE FOR PRODUCING MOLDINGS.

APPLICATION FILED AUG. 1, 1907.

UNITED STATES PATENT OFFICE.

PETER LORENTZEN, OF APENRADE, GERMANY.

MACHINE FOR PRODUCING MOLDINGS.

No. 884,175.  Specification of Letters Patent.  Patented April 7, 1908.

Application filed August 1, 1907. Serial No. 386,656.

*To all whom it may concern:*

Be it known that I, PETER LORENTZEN, a subject of the Emperor of Germany, residing at Apenrade, Germany, have invented certain new and useful Improvements in Machines for Producing Moldings with Arched Decorations, of which the following is a full, clear, and exact specification.

The object of the present invention is a machine serving to cut arched decorations into the face of moldings, face-boards and the like which intersect each other at any point of the arches.

A revolving profile cutter is preferably secured to a vertical shaft, and the molding is secured under the cutter and sidewise to the shaft so that the cutter can act on the upper surface, means being provided for the cutting profile to sink into the wood gradually, either by moving the cutter shaft longitudinally or by moving the work piece against the cutters. In the device described below as an example the cutter shaft revolves in stationary bearings and the moldings are lifted up against the cutters to be acted upon. Clamps holding the molding can easily be adjusted so that the molding is moved longitudinally at certain intervals and then clamped again in place.

Figures 1, 2:
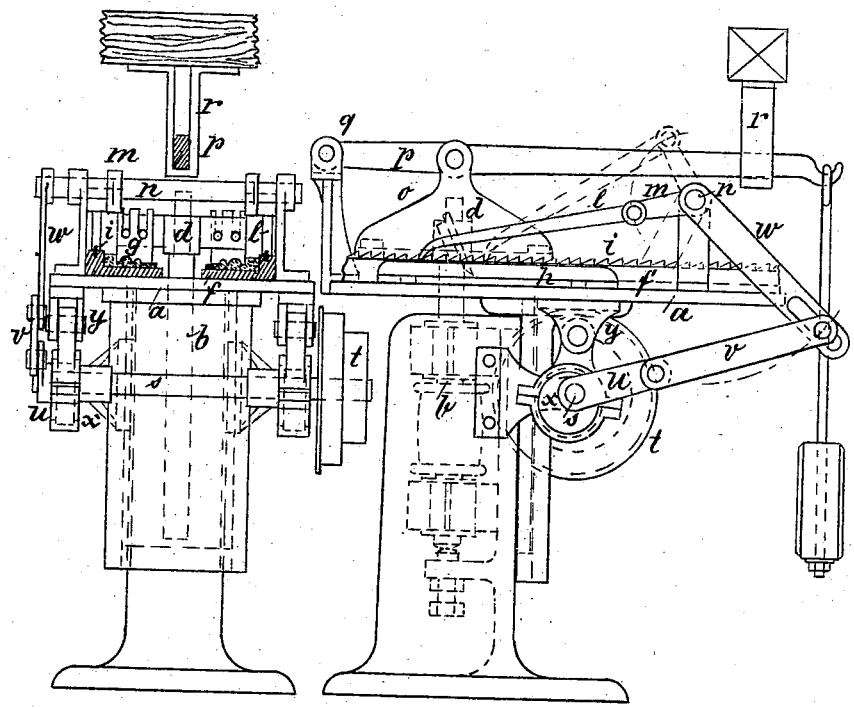
Figure 3:
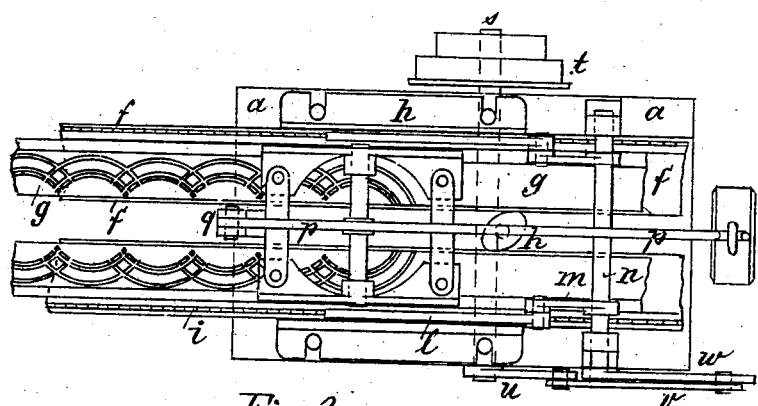

The accompanying drawing shows a machine in end elevation in Figure 1 and in side elevation, Fig. 2, while Fig. 3 is a plan view.

The machine is an ordinary cutting machine having its vertical spindle well secured in the frame and the table upon the frame is adapted to be moved up and down. Above said table $a$ the cutter head $d$ is moving with the spindle or shaft $b$ and the arms carry the profiled cutting blades, preferably in an inclined position.

To the right and left of the spindle $b$ carriers $f$ can be moved with the strips of wood $g$ secured thereto longitudinally and up and down to be acted upon by the cutters. These carriers $f$ are provided with racks $i$ to be engaged by pawls $l$ pivotally connected to arms $m$, which are secured to a horizontal shaft $n$ above the table. The work pieces are held in position by arc shaped cheeks $o$ pivoted to a lever $p$ which has one end fulcrumed to a pin secured in an upright $q$ of the frame and is being guided at its weighted front end in a strap $r$, suspended from the ceiling. Thus the work pieces are securely pressed down on their carriers or supports $f$ while the cutters are at work.

The driving shaft $s$ receives motion by means of a graded belt pulley $t$ secured on one end of said shaft, while the other end is provided with a crank $u$, which is connected with the shaft $n$ by means of a connecting rod $v$ and an arm $w$. Thus the pawls $l$ are moved forward and backward as long as the shaft $s$ is rotated. The shaft $s$ is further provided with two eccentrics which are connected by pivots $y$ to the table $a$, thereby producing a gradual lifting and lowering of the same.

The connections are so arranged that while the table is lifted and the cutter acts on the wood, the pawls are withdrawn, and the table with the work pieces is lowered before the pawls are moving forward to produce the longitudinal displacement of the work piece. When the table is lifted, the cheeks $o$ resting on the moldings raise the lever $p$ with its weight and thereby secure the actual position of the work piece.

Having thus described my invention, what I claim is:

1. In a machine for producing moldings with arched decorations, a shaft with cutters revolving in a horizontal plane, carriers as a support for moldings, arranged at the sides of the shaft and under the cutting profile of the cutter blade, provided with means to raise them gradually against the cutters and periodically shift them lengthwise, substantially as described and for the purpose set forth.

2. In a machine for producing moldings with arched decorations, a shaft with cutters revolving in a horizontal plane, carriers as a support for moldings, arranged at the sides of the shaft and under the cutting profile of the cutting blade, a table supporting and guiding said carriers, a driving shaft with eccentrics connected to the table in order to raise or lower the same with the carriers for the molds, a crank on said driving shaft having its pin approximately opposite the lobe of the eccentrics, a rocking shaft above the table connected to the crank pin by a suitable rod and lever, pawls pivotally connected to suitable arms on the rock shaft and racks on the carriers for the moldings adapted to be engaged by the pawls substantially as described.

3. In a machine for producing moldings with arched decorations, a shaft with cutters revolving in a horizontal plane, carriers as a support for moldings, arranged at the sides of the shaft and under the cutting profile of the cutter blade, a table supporting and guiding said carriers, a driving shaft with eccentrics connected to the table in order to raise or lower the same with the carriers for the molds, a crank on said driving shaft having its pin approximately opposite the lobe of the eccentrics, a rocking shaft above the table connected to the crank pin by a suitable rod and lever, pawls pivotally connected to suitable arms on the rock shaft and racks on the carriers for the moldings adapted to be engaged by the pawls, cheeks adapted to press on the moldings, a weighted lever pivotally connected with said cheeks to press it down upon the moldings.

In testimony whereof I affix my signature.

PETER LORENTZEN.

In the presence of—
JULIUS RÖPKE,
HERMANN VOIGT.